United States Patent
Itadani (10) Patent No.: US 9,958,010 B2
(45) Date of Patent: May 1, 2018

(54) SLIDING COMPONENT

(71) Applicant: EAGLE INDUSTRY CO., LTD., Minato-ku, Tokyo (JP)

(72) Inventor: Masatoshi Itadani, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days. days.

(21) Appl. No.: 14/400,253

(22) PCT Filed: Jul. 31, 2013

(86) PCT No.: PCT/JP2013/070713
§ 371 (c)(1),
(2) Date: Nov. 10, 2014

(87) PCT Pub. No.: WO2014/024741
PCT Pub. Date: Feb. 13, 2014

(65) Prior Publication Data
US 2015/0139578 A1    May 21, 2015

(30) Foreign Application Priority Data

Aug. 4, 2012   (JP) ................................ 2012-173493

(51) Int. Cl.
*F16J 15/34*   (2006.01)
*F16C 33/74*   (2006.01)
*F16C 17/02*   (2006.01)

(52) U.S. Cl.
CPC ............ *F16C 33/74* (2013.01); *F16C 17/026* (2013.01); *F16J 15/3412* (2013.01)

(58) Field of Classification Search
CPC .... F16J 15/441; F16J 15/3412; F16J 15/3484; F16J 15/3496; F16C 14/026; F16C 33/74; F16C 17/026

(Continued)

(56) References Cited

U.S. PATENT DOCUMENTS 3,704,019 A * 11/1972 McHugh ........................ 277/400
4,889,348 A * 12/1989 Amundson ........... F04D 29/126
                                                          277/306

(Continued)

FOREIGN PATENT DOCUMENTS

CN    101793169 A    8/2010
JP    S59-195253 U   12/1984

(Continued)

OTHER PUBLICATIONS

International Search Report (ISR) dated Oct. 29, 2013, issued for International application No. PCT/JP2013/070713.

(Continued)

*Primary Examiner* — Nathan Cumar
(74) *Attorney, Agent, or Firm* — Hayes Soloway P.C.

(57) ABSTRACT

A sliding component, which can seal and lubricate at the same time by reducing the amount of leakage of sealed fluid further while preventing torque increase and local wear, is characterized in that an extremely shallow step of circular shape is provided on a sealing face of one of a pair of sliding parts that slide against each other in such a way that the step is positioned on the low-pressure fluid side (atmosphere side) of this sealing face and also set lower than the sealing face, and that pumping grooves acting to push back toward the high-pressure fluid side (sealed fluid side) the fluid that tends to leak from the sealing face toward the low-pressure fluid side (atmosphere side) are provided on the surface of the extremely shallow step.

5 Claims, 5 Drawing Sheets

(58) Field of Classification Search
USPC ....... 277/399, 306, 348, 345, 352, 358, 400, 277/559
See application file for complete search history.

(56) References Cited

U.S. PATENT DOCUMENTS

| | | | |
|---|---|---|---|
| 5,071,141 A | 12/1991 | Lai et al. | |
| 5,180,173 A | 1/1993 | Kimura et al. | |
| 5,224,714 A * | 7/1993 | Kimura | F16J 15/3412 277/400 |
| 5,947,481 A * | 9/1999 | Young | 277/400 |
| 6,152,452 A * | 11/2000 | Wang | 277/400 |
| 7,258,346 B2 * | 8/2007 | Tejima | 277/399 |
| 7,377,518 B2 * | 5/2008 | Lai | F16J 15/3408 277/400 |
| 2005/0212217 A1 * | 9/2005 | Tejima | F16J 15/3412 277/399 |
| 2005/0263963 A1 * | 12/2005 | Lai | F16J 15/3412 277/399 |
| 2008/0100001 A1 * | 5/2008 | Flaherty | F16J 15/3412 277/400 |

FOREIGN PATENT DOCUMENTS

| | | |
|---|---|---|
| JP | S59-195254 U | 12/1984 |
| JP | H06-017941 A | 1/1994 |
| JP | H06-323442 A | 11/1994 |
| JP | 2003343730 A | 12/2003 |
| JP | 2008-106940 A | 5/2005 |
| JP | 2005-180652 A | 7/2005 |
| JP | 2005-337503 A | 12/2005 |

OTHER PUBLICATIONS

Notification of Transmittal of Translation of the International Preliminary Report on Patentability (PCT/IB/338) dated Feb. 19, 2015, with International Preliminary Report on Patentability (PCT/IB/373) and Written Opinion of the International Searching Authority (PCT/ISA/237), for corresponding international application PCT/JP2013/070713.
First Notification of Reason for Refusal with Search Report issued by the State Intellectual Property Office of China dated Aug. 24, 2015 for Chinese counterpart application No. 201380024836.9.
First Notification of Reason for Refusal with Search Report issued by the State Intellectual Property Office of China dated Aug. 26, 2015 for Chinese counterpart application No. 201380009242.0.
Second Notification of Reason for Refusal issued by the State Intellectual Property Office of China dated Feb. 5, 2016 for Chinese counterpart application No. 201380024836.9.

* cited by examiner

Background Art

9,958,010 B2

SLIDING COMPONENT

This application is the U.S. National Phase under 35 U.S.C. § 371 of International Application PCT/JP2013/070713, filed Jul. 31, 2013, which claims priority to Japanese Patent Application No. 2012-173493, filed Aug. 4, 2012. The International Application was published under PCT Article 21(2) in a language other than English.

TECHNICAL FIELD

The present invention relates to a sliding component suitable for mechanical seals, bearings and other sliding mechanisms, for example. In particular, the present invention relates to a sliding component for seal rings, bearings, etc., that must reduce friction by retaining a fluid on the sealing face and also prevent the fluid from leaking from the sealing face.

BACKGROUND ART

For a mechanical seal, which is an example of sliding component, to maintain sealing property for a long period of time, it must satisfy the mutually exclusive conditions of "seal" and "lubricate." Particularly in recent years, the demand for lower friction is increasing further in the area of environmental protection, etc., as a means to prevent the sealed fluid from leaking while reducing mechanical loss at the same time. One way to reduce friction is to generate dynamic pressure between the sealing faces by means of rotation to create the so-called fluid lubrication state where the surfaces slide against each other with a liquid film in between. In this case, however, positive pressure generates between the sealing faces and the fluid flows from the sealing faces from the part subject to the positive pressure. This is the so-called lateral leak that occurs with bearings and corresponds to the sealing leak.

Figure 4:
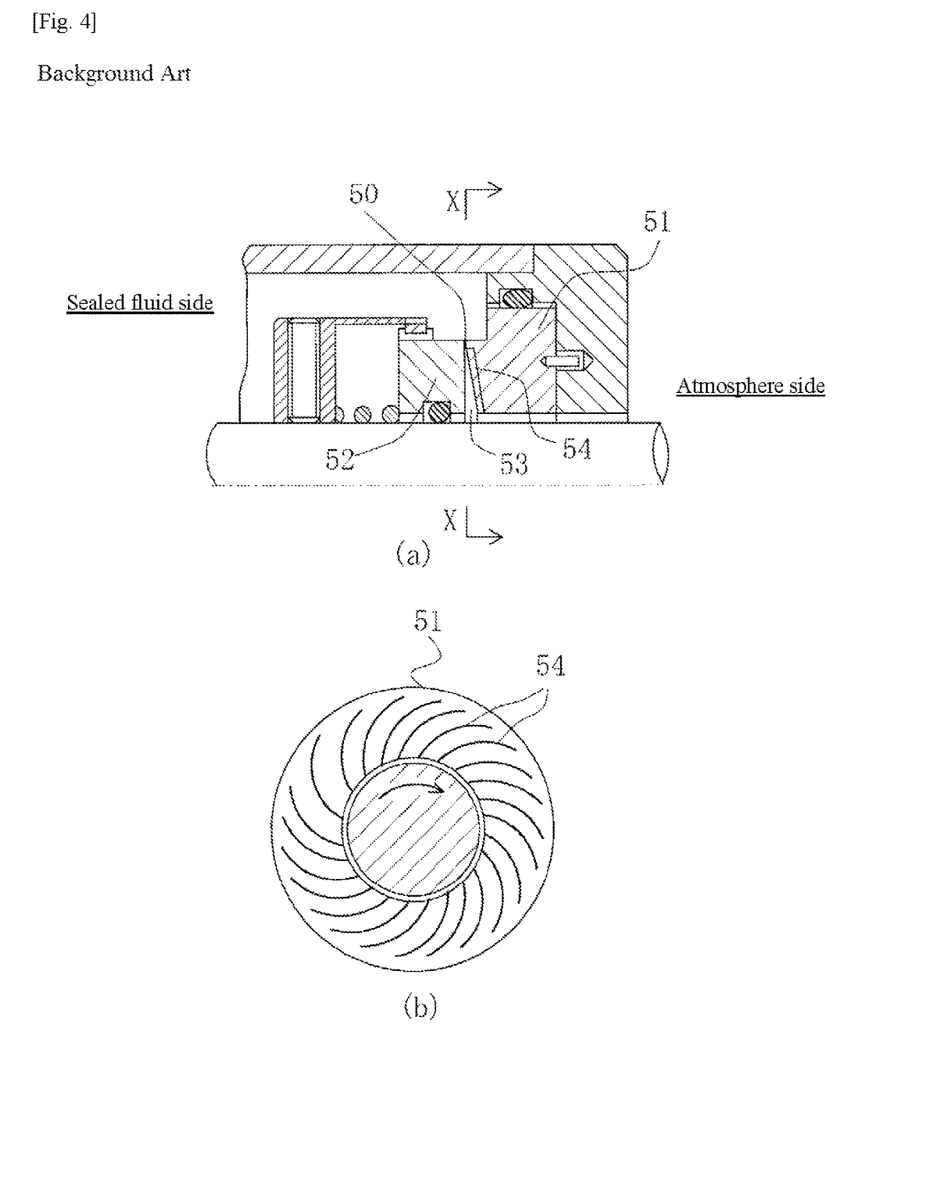
FIG. 4 Drawings explaining Prior Art 1, where (a) is a longitudinal section view, while (b) is a section view cutting (a) along X-X.

Traditionally in the field of so-called "inside type" mechanical seals, where the mechanical seal is comprised of a seal area separating a fluid to be sealed on the outer periphery side and atmosphere on the inner periphery side to seal the fluid on the outer periphery side, the one shown in FIG. 4 is known wherein, to reduce the frictional torque while offering good sealing performance, a tapered passage 53 that gradually widens toward the interior is provided on the inner periphery of a seal contacting area 50 of a stationary seal ring 51 and rotating seal ring 52, with a single or multiple spiral grooves 54 provided radially on the side of this passage 53 in such a way that one end of this spiral groove 54 contacts the inner periphery of the seal contacting area 50 (hereinafter referred to as "Prior Art 1"; refer to Patent Literature 1).

Figure 5:
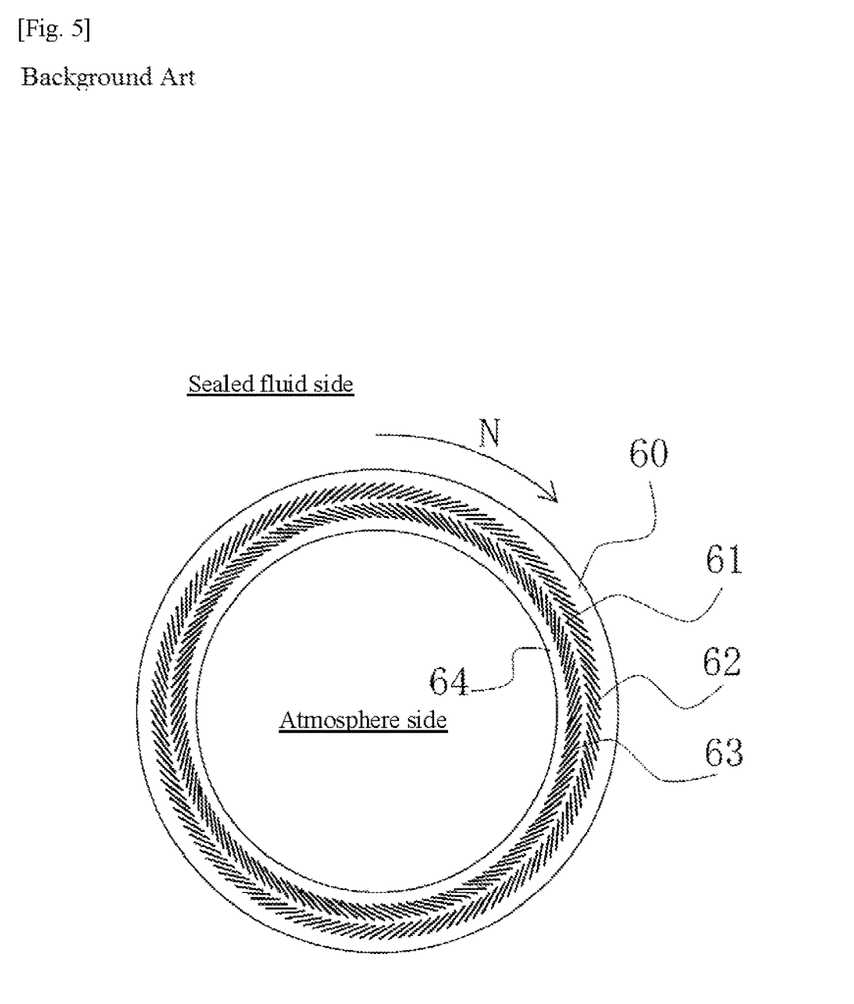
FIG. 5 Plan view explaining Prior Art 2.

Also, traditionally in the field of sliding components used for so-called "inside type" mechanical seals, etc., the component shown in FIG. 5 is known which comprises: a first dam 61 provided on a sealing face 60 and forming a circular shape; a suction means 62 consisting of multiple dimples arranged in a circular pattern, where the dimples are narrow grooves inclined by a certain angle from the first dam 61 toward the sealed fluid side corresponding to a rotational direction; a discharge means 63 consisting of multiple dimples arranged in a circular pattern, where the dimples are narrow grooves inclined by a certain angle from the first dam 61 in the rotational direction opposite the one in which the suction means 62 is inclined; and a seal area 64 formed on the periphery face of the discharge means 63 on the opposite side of the first dam 61 (hereinafter referred to as "Prior Art 2"; refer to Patent Literature 2).

However, Prior Art 1 presents problems because the radial-direction width of the seal contacting area 50 is decreased and a tapered passage 53 that gradually widens toward the interior is provided on the inner periphery of the seal contacting area 50, with spiral grooves 54 provided on the side of this passage 53, where the first problem is that high surface pressure generates on the sealing face 50 to increase local friction, while the second problem is that the pumping effect of the spiral grooves 54 on the inner periphery side of the tapered passage 53 decreases.

On the other hand, Prior Art 2, which is designed with multiple dimples being narrow grooves inclined toward the sealed fluid side of the seal area arranged in a circular pattern to actively draw the sealed fluid onto the seal area, and with multiple dimples being narrow grooves inclined toward the atmosphere side of the seal area arranged in a circular pattern to push back the fluid toward the sealed fluid side via the pumping effect, presents a problem in that too strong a pumping effect of the dimples on the sealed fluid side increases the amount of leakage, while too strong a pumping effect of the dimples on the atmosphere side drains the sealed fluid from the seal area, thereby causing the dimples formed on the seal area to directly contact the mating sealing face to increase the torque, while causing the dimples to gradually wear and leading to loss of pumping effect.

CITATION LIST

Patent Literatures

{Patent Literature 1} Japanese Utility Model Laid-open No. Sho 59-195254
{Patent Literature 2} Japanese Patent Laid-open No. 2005-180652

SUMMARY OF INVENTION

Technical Problem

An object of the present invention is to provide a sliding component that can seal and lubricate at the same time by reducing the amount of leakage of sealed fluid further while preventing torque increase and local wear.

Solution to Problem

To achieve the aforementioned object, firstly, the sliding component proposed by the present invention is characterized in that an extremely shallow step of circular shape is provided on the sealing face of one of a pair of sliding parts that slide against each other in such a way that the step is positioned on the low-pressure fluid side (atmosphere side) of this sealing face and also set lower than the sealing face, and that pumping grooves acting to push back toward the high-pressure fluid side (sealed fluid side) the fluid that tends to leak from the sealing face toward the low-pressure fluid side (atmosphere side) are provided on the surface of the extremely shallow step.

According to these features, the entire sealing face (excluding the extremely shallow step) is positioned on the high-pressure fluid side of the extremely shallow step and therefore the lubricated state of the entire sealing face (excluding the extremely shallow step) can be maintained while reducing the leakage of sealed fluid, and also, unlike under the prior art where grooves are formed directly on the sealing face, the extremely shallow step would not directly contact the mating sealing face should all fluid on the sealing face be gone, which means that the pumping grooves do not cause the rotational torque to increase and thus increase in rotational torque can be prevented. In addition, the pumping grooves are not affected even if the sealing face gets worn to some extent, which is to say that the lubrication properties and leakage properties are not negatively affected.

Furthermore, there is no need to decrease the radial-direction width of the sealing face, unlike under Prior Art 1, which means that the surface pressure at the sealing face does not increase.

Also, secondly, the sliding component proposed by the present invention is characterized in that, in addition to the first features, the depth h of the extremely shallow step from the sealing face is set preferably in a range of 10 nm to 1 μm.

Also, thirdly, the sliding component proposed by the present invention is characterized in that, in addition to the first features, the depth h of the extremely shallow step from the sealing face is set more preferably in a range of 50 to 500 nm.

Also, fourthly, the sliding component proposed by the present invention is characterized in that, in addition to any of the first through third features, the radial-direction width b of the extremely shallow step is set preferably in a range of one-half to one-tenth the radial-direction width of the sealing face.

According to the second through fourth features, leakage can be reduced, increase in rotational torque can be prevented, and local wear can also be prevented further.

Also, fifthly, the sliding component proposed by the present invention is characterized in that, in addition to any of the first through fourth features, the pumping grooves are constituted by spiral shaped grooves.

Also, sixthly, the sliding component proposed by the present invention is characterized in that, in addition to any of the first through fourth features, the pumping grooves are constituted by multiple dimples.

Also, seventhly, the sliding component proposed by the present invention is characterized in that, in addition to any of the first through fourth features, the pumping grooves are constituted by fine cyclical grooves.

According to the fifth through seventh features, pumping grooves offering good pumping efficiency can be obtained.

Advantageous Effects of Invention

The present invention provides excellent effects as described below:

(1) An extremely shallow step of circular shape is provided on one sealing face in such a way that the step is positioned on the low-pressure fluid side (atmosphere side) of this sealing face and also set lower than the sealing face, while pumping grooves acting to push back toward the high-pressure fluid side (sealed fluid side) the fluid that tends to leak from the sealing face toward the low-pressure fluid side (atmosphere side) are provided on the surface of the extremely shallow step, and accordingly the entire sealing face (excluding the extremely shallow step) is positioned on the high-pressure fluid side of the extremely shallow step and therefore the lubricated state of the entire sealing face (excluding the extremely shallow step) can be maintained while reducing the leakage of sealed fluid, and also, unlike under the prior art where grooves are formed directly on the sealing face, the extremely shallow step would not directly contact the mating sealing face should all fluid on the sealing face be gone, which means that the pumping grooves do not cause the rotational torque to increase and thus increase in rotational torque can be prevented. In addition, the pumping grooves are not affected even if the sealing face becomes worn to some extent, which is to say that the lubrication properties and leakage properties are not negatively affected.

Furthermore, there is no need to decrease the radial-direction width of the sealing face, unlike under Prior Art 1, which means that the surface pressure at the sealing face does not increase.

(2) By optimally setting the depth and radial-direction width of the extremely shallow step, leakage can be reduced, increase in rotational torque can be prevented, and local wear can also be prevented further.

(3) By constituting the pumping grooves with spiral shaped grooves, multiple dimples, or fine cyclical grooves, pumping grooves offering good pumping efficiency can be obtained.

DESCRIPTION OF EMBODIMENTS

Modes for carrying out a sliding component according to the present invention are explained in detail by referring to the drawings.

It should be noted that, while the embodiments herein are explained as an example where the part comprising the mechanical seal is a sliding component, interpretation of the present invention is not limited to the foregoing, and various changes, modifications, and improvements can be added based on the knowledge of those skilled in the art so long as they do not deviate from the scope of the present invention.

Figure 1:
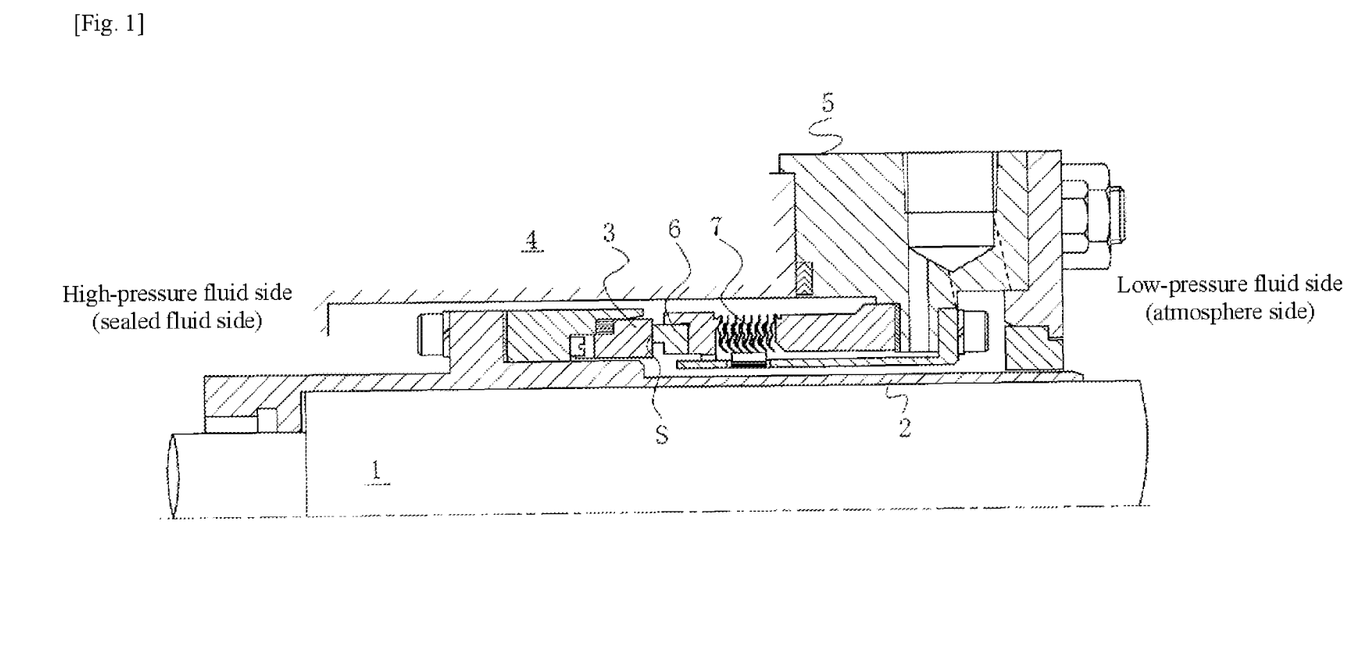
FIG. 1 Longitudinal section view showing an example of a mechanical seal for general industrial machinery.
Figure 2:
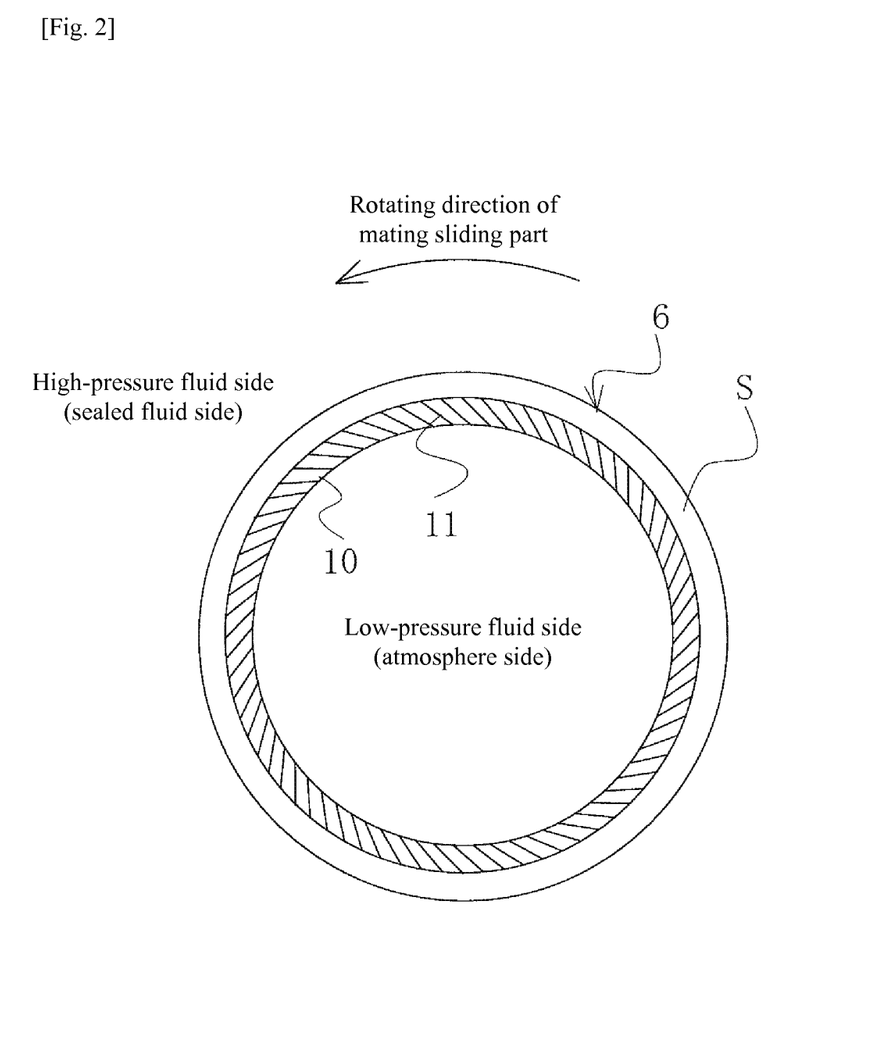
FIG. 2 Plan view pertaining to an embodiment of the present invention, showing a sealing face on which an extremely shallow step and pumping grooves are formed.
Figure 3:
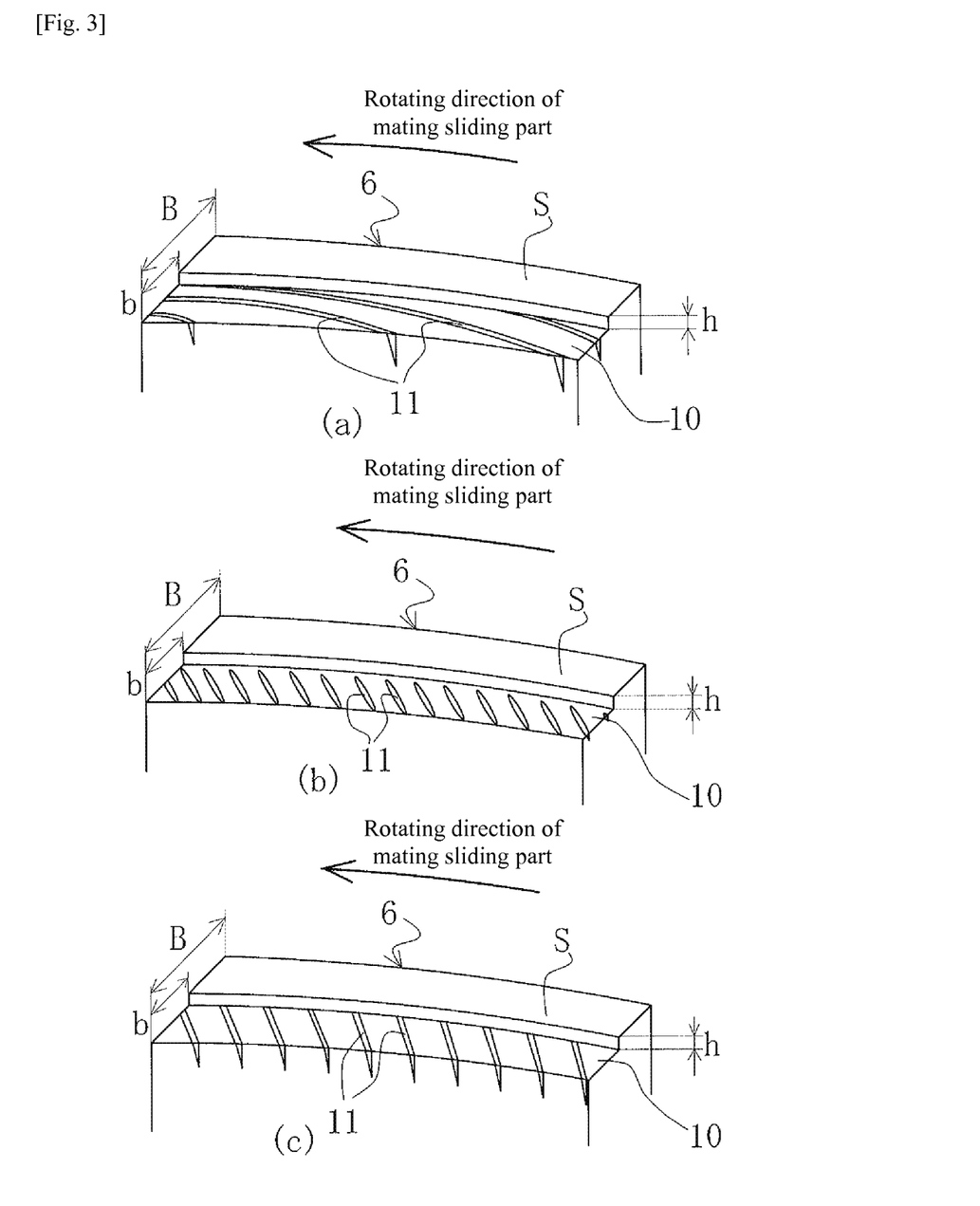
FIG. 3 Perspective views explaining extremely shallow steps and pumping grooves formed on sealing faces, where the pumping grooves are constituted by spiral shaped grooves in (a), the pumping grooves are constituted by multiple dimples in (b), and the pumping grooves are constituted by fine cyclical grooves in (c).

Sliding components pertaining to the modes for carrying out the present invention are explained by referring to FIGS. 1 to 3.

FIG. 1 is a front section view showing an example of a mechanical seal for general industrial machinery.

The mechanical seal in FIG. 1 is of the inside type, which is the type that seals the fluid that tends to leak from the outer periphery to the inner periphery of the sealing face, comprising: a circular rotating ring 3 that constitutes one sliding part provided via a sleeve 2 on a rotational axis 1 for driving a pump impeller (not illustrated) on the high-pressure fluid side (sealed fluid side) in a manner rotatable together with the rotational axis 1; and a circular stationary ring 6 that constitutes the other sliding part provided on a seal cover 5 fixed on a pump housing 4 in a manner not rotatable but movable in the axial direction, wherein the sealing faces S of the two that have been mirror-surface-finished by means of lapping, etc., are caused to slide against each other while remaining in contact via a bellows 7 that biases the stationary ring 6 in the axial direction. In other words, this mechanical seal prevents the sealed fluid from flowing from the outer periphery to inner periphery side of the rotational axis 1 between the sealing faces S of the rotating ring 3 and stationary ring 6.

Typically the rotating ring 3 and stationary ring 6 are both formed from SiC (hard material) or one is formed from SiC (hard material) and the other from carbon (soft material), but for the sliding material, anything that is in use as sliding material for mechanical seals can be applied. The SiC may be a sintered compact using boron, aluminum, carbon, etc., as a sintering auxiliary, or it may be a material constituted by two or more different phases each having a different constituent and composition, such as SiC in which graphite grains are dispersed, reaction-sintered SiC constituted by SiC and Si, SiC—TiC, or SiC—TiN. For the carbon, a mixture of carbon and graphite materials, resin-forming carbon, sintered carbon, etc., can be used. Besides the aforementioned sliding materials, metal materials, resin materials, surface reforming materials (coating materials), and complex materials can also be applied.

Explained in FIGS. 2 and 3 are cases where, for example, an extremely shallow step and pumping grooves conforming to the present invention are provided on the sealing face S of the circular stationary ring 6 representing one sliding component, but it goes without saying that they can be provided on the sealing face of the circular rotating ring 3.

Normally, high-pressure sealed fluid is present on one of the inner periphery side and outer periphery side of the sealing face S of the sliding component, while the other side is exposed to atmosphere, but in the cases explained by FIGS. 2 and 3, high-pressure sealed fluid is present on the outer periphery side, while atmosphere is present on the inner periphery side, for illustration purposes.

The stationary ring 6 has a convex section shape as shown in FIG. 1, with its top face constituting the sealing face S. As shown in FIGS. 2 and 3, this sealing face S has an extremely shallow step 10 of circular shape provided on it, being positioned on the low-pressure fluid side (atmosphere side) and set lower than the sealing face S, with the inner periphery side of the extremely shallow step 10 contacting the low-pressure fluid (atmosphere). In addition, pumping grooves 11 acting to push back toward the high-pressure fluid side (sealed fluid side) the fluid that tends to leak from the sealing face S toward the low-pressure fluid side (atmosphere side) are provided on the surface of the extremely shallow step 10.

The extremely shallow step 10 of circular shape is provided not across the entire radial-direction width of the sealing face S, but it is provided on the low-pressure fluid side (atmosphere side), or specifically on the inner periphery side in this example, and because the entire sealing face excluding the extremely shallow step 10 is positioned on the high-pressure fluid side of the extremely shallow step 10, leakage of sealed fluid can be reduced while maintaining the lubricated state of the entire sealing face (excluding the extremely shallow step).

The radial-direction width b of the extremely shallow step 10 and its depth h from the sealing face S are set according to the type of the sealed fluid and material of the sliding component.

For example, the radial-direction width b of the extremely shallow step 10 is set preferably in a range of one-half to one-tenth the radial-direction width B of the sealing face (including the extremely shallow step).

In addition, the depth h of the extremely shallow step 10 from the sealing face S is set preferably in a range of 10 nm to 1 µm m, or more preferably in a range of 50 to 500 nm.

The pumping grooves 11 provided on the surface of the extremely shallow step 10 act to push back toward the high-pressure fluid side (sealed fluid side) the fluid that tends to leak from the sealing face S toward the low-pressure fluid side (atmosphere side), and if the mating sliding part is rotating in the counterclockwise direction, the pumping grooves 11 are formed in a manner inclining in the counterclockwise direction from the line passing through the center (diameter) of the stationary ring 6, as shown in FIG. 2.

A narrower radial-direction width b of the extremely shallow step 10 improves the lubrication properties but increases the tendency to leak, while a wider radial-direction width decreases the tendency to leak but causes the lubrication properties to deteriorate. Because of the above, the radial-direction width b of the extremely shallow step 10 must be set optimally according to the type of sealed fluid and material of the sliding component.

Next, examples of how the pumping grooves 11 formed on the surface of the extremely shallow step 10 are constituted, are explained based on FIG. 3.

In FIG. 3(a), the pumping grooves 11 are constituted by spiral shaped grooves.

In this case, the spiral shapes are formed in a corkscrew pattern inclining in the counterclockwise direction from the line passing through the center (diameter) of the stationary ring 6.

In FIG. 3(b), on the other hand, the pumping grooves 11 are constituted by multiple dimples.

In this case, the multiple dimples are formed in a manner inclining in the counterclockwise direction from the line passing through the center (diameter) of the stationary ring 6.

Furthermore, in FIG. 3(c), the pumping grooves 11 are constituted by fine cyclical grooves.

In this case, the cyclical grooves are constituted by the projections and concaves of multiple lines that are arranged in parallel with one another at a specified pitch, formed in a manner inclining in the counterclockwise direction from the line passing through the center (diameter) of the stationary ring 6.

Next, methods to form the extremely shallow step 10 and pumping grooves 11 on the sealing face S are explained.

For example, one method is to etch the extremely shallow step 10 and then form the pumping grooves 11 on the surface of the extremely shallow step 10 using a laser. Additionally, it is possible to form the extremely shallow step 10 and pumping grooves 11 all at once by means of femtosecond laser processing. A picosecond laser or electron beam may also be used, besides etching or femtosecond laser processing. In fact, any other processing method can be used so long as it is capable of forming the extremely shallow step 10 and pumping grooves 11.

In the case of the mechanical seal shown in FIG. 1, which is equipped with a sliding component pertaining to a mode for carrying out the present invention, high-pressure sealed fluid enters between the sealing faces S of the rotating ring 3 and stationary ring 6 and tries to expand the gap, but as the force to expand the gap balances out with the fluid pressure and bellows 7 force to push the stationary ring 6 from behind, the narrow gap is retained and the sealing faces S remain in a state of fluid lubrication. Having entered the narrow gap between the sealing faces S, the sealed fluid tends to leak toward the low-pressure fluid side (atmosphere side), but under the present invention, the extremely shallow step 10 and pumping grooves 11 provided on the low-pressure fluid side (atmosphere side) (inner periphery side in FIGS. 1 to 3) of the sealing face S push back the fluid that tends to leak toward the low-pressure fluid side (atmosphere side) toward the high-pressure fluid side (sealed fluid side). As a result, the amount of sealed fluid leaking from the low-pressure fluid side (atmosphere side) is reduced considerably.

The actions/effects of a sliding component pertaining to a mode for carrying out the present invention are described below.

Under the present invention, pumping grooves 11 acting to push back toward the high-pressure fluid side (sealed fluid side) the fluid that tends to leak from the sealing face S toward the low-pressure fluid side (atmosphere side) are provided on the surface of the extremely shallow step 10 of circular shape being positioned on the low-pressure fluid side (atmosphere side) and set lower than the sealing face S, and accordingly the entire sealing face (excluding the extremely shallow step) is positioned on the high-pressure fluid side of the extremely shallow step and therefore the lubricated state of the entire sealing face (excluding the extremely shallow step) can be maintained while leakage of sealed fluid can be reduced, and unlike under the prior art where grooves are formed directly on the sealing face, the extremely shallow step would not directly contact the mating sealing face should all fluid on the sealing face be gone, which means that the pumping grooves do not cause the rotational torque to increase and thus increase in rotational torque can be prevented. In addition, the pumping grooves are not affected even if the sealing face becomes worn to some extent, which is to say that the lubrication properties and leakage properties are not negatively affected.

Furthermore, there is no need to decrease the radial-direction width of the sealing face, unlike under Prior Art 1, which means that the surface pressure at the sealing face does not increase.

The foregoing explained the modes for carrying out the present invention using the drawings, but the specific constitutions are not limited to these modes and changes and additions are also included in the present invention so long as they do not deviate from the key points of the present invention.

In the aforementioned modes, for instance, examples of using the sliding component for either one of a pair of rotating seal ring and stationary seal ring of a mechanical seal device were explained; however, it is possible to use this component as a sliding component of a bearing that slides with a rotational axis while sealing lubricating oil on one side of a cylindrical sealing face in the axial direction.

Additionally in the aforementioned modes, for instance, cases where high-pressure sealed fluid is present on the outer periphery side were explained; however, the present invention can also be applied when high-pressure fluid is present on the inner periphery side, in which case the extremely shallow step 10 and pumping grooves 11 only need to be provided on the outer periphery side of the sealing face.

REFERENCE SIGNS LIST

1 Rotational axis
2 Sleeve
3 Rotating ring
4 Housing
5 Seal cover
6 Stationary ring
7 Bellows
10 Extremely shallow step
11 Pumping groove
S Sealing face
B Radial-direction width of the sealing face (including the extremely shallow step)
b Radial-direction width of the extremely shallow step
h Depth of the extremely shallow step

The invention claimed is:

1. A sliding component comprising:
a pair of ring-shaped sealing faces adapted to slide against each other;
a step of extremely shallow depth provided on the ring-shaped sealing face of one of said pair of sliding components, the step having a bottom surface lower than a surface of the sealing face and being isolated from a high-pressure fluid side by the sealing face and open to a low-pressure fluid side so as to contact a low-pressure fluid; and
multiple spiral shaped or cyclical shaped pumping grooves provided on a bottom surface of the step for pushing back toward the high-pressure fluid side fluid that may leak from the sealing face toward the low-pressure fluid side,
wherein a radial-direction width b of the step is set in a range of one-half to one-tenth a radial-direction width B of the sealing face to prevent increase in rotational torque.

2. A sliding component according to claim 1, wherein a depth h of the step from the surface of the sealing face is set in a range of 10 nm to 1 μm.

3. A sliding component according to claim 1, wherein a depth h of the step from the surface of the sealing face is set in a range of 50 to 500 nm.

4. A sliding component according to claim 1, wherein all the pumping grooves are provided on the bottom surface of the step.

5. A sliding component according to claim 1, wherein the pumping grooves are open at one end to the high pressure fluid side.

* * * * *